United States Patent [19]
Fix, Sr. et al.

[11] Patent Number: 5,606,153
[45] Date of Patent: Feb. 25, 1997

[54] ROBOTIC FILTER WEIGHING SYSTEM

[75] Inventors: Robert J. Fix, Sr., Kernersville; Bain C. McConnell, Clemmons; James T. Atkins, Pfafftown; Philip A. Deal, Winston-Salem; Timothy A. Hobbs, Greensboro; John L. Nelson, Lewisville; John W. Thompson, Advance, all of N.C.

[73] Assignee: R. J. Reynolds Tobacco Company, Winston-Salem, N.C.

[21] Appl. No.: 224,610

[22] Filed: Apr. 7, 1994

[51] Int. Cl.⁶ .......................... G01G 19/00; G01G 13/00; B65G 69/00; G05B 15/00
[52] U.S. Cl. .............................. 177/145; 177/1; 177/245; 414/21; 395/80; 901/6
[58] Field of Search .......................... 414/21, 786; 901/6, 901/46; 395/89, 80, 82, 84, 92, 93; 177/1, 25.11, 25.13, 25.14, 145, 180, 181, 182, 238, 245

[56] References Cited

U.S. PATENT DOCUMENTS

| | | | |
|---|---|---|---|
| 4,835,711 | 5/1989 | Hutchins et al. | 901/6 X |
| 5,092,414 | 3/1992 | Blezard | 177/145 X |
| 5,187,976 | 2/1993 | Gossler et al. | 414/21 X |
| 5,306,087 | 4/1994 | Nakamura et al. | 177/245 X |
| 5,504,278 | 4/1996 | Deters et al. | 177/145 |

*Primary Examiner*—Michael L. Gellner
*Assistant Examiner*—Randy W. Gibson

[57] ABSTRACT

A method of, and apparatus for, a robotic filter weighing system for weighing filters stored in sample holders which includes a sample cabinet which holds a carousel having a plurality of filter samples contained in a like plurality of sample holders and in which a robotic system is used for removing in turn each of the sample holders and sequentially placing each of the sample holders in a filter extraction station for removing the filter from its respective holder. The robot system then moves the extracted filter to a weighing system which calculates the weight of the particulate matter contained on the filter and then replaces the filter in its sample holder and replaces the sample holder back in the sample cabinet.

37 Claims, 8 Drawing Sheets

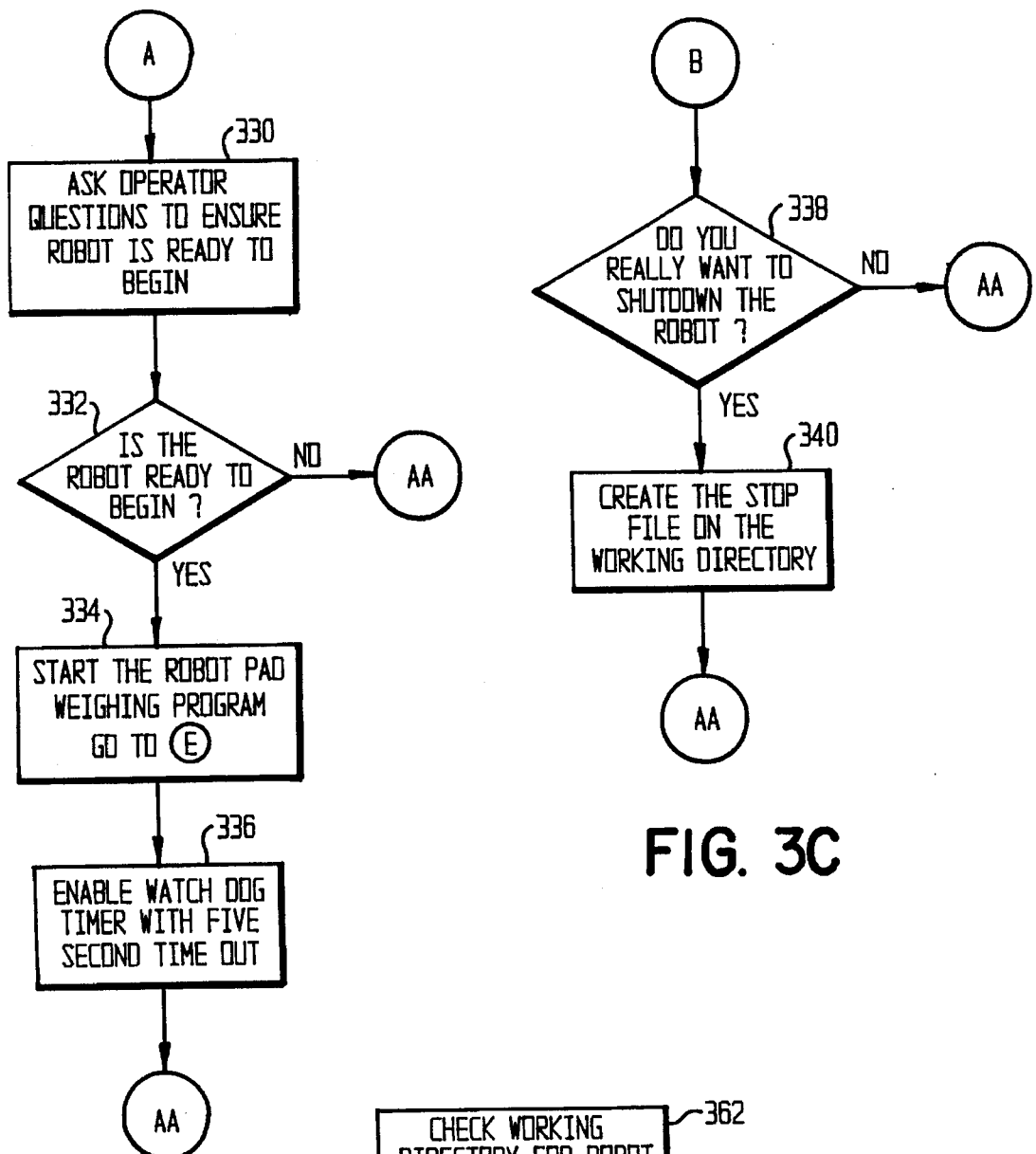
FIG. 3B
FIG. 3C
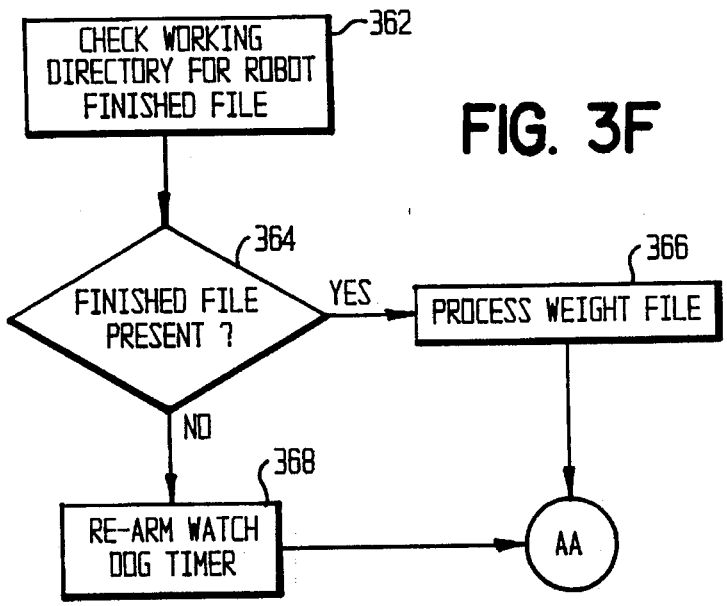
FIG. 3F

ROBOTIC FILTER WEIGHING SYSTEM

BACKGROUND OF THE INVENTION

The present invention relates generally to a method and apparatus for the unattended weighing of filters used for sampling air quality. More particularly, the present invention relates to a method of and apparatus for the unattended weighing of respirable particulate matter (RSP) filters used for air quality sampling.

Various government agencies, for example, the Environmental Protection Agency (EPA) and the Occupational Safety and Health Administration (OSHA) in the United States have become increasingly interested and concerned about indoor air quality. In the future, it is likely that standards will be promulgated by those or other governmental agencies regarding indoor air quality. Already, certain business enterprises are subject to indoor air quality standards.

Indoor air quality studies are generally conducted utilizing a filter and a pump which draws air through the filter. Alternatively, the filters can be used together with a holder but without a pump. By being placed in an indoor environment, the filters gather respirable particulate matter or other particulates which then must be weighed in order to determine the percentage of such particulate matter within the indoor air and, therefore, the quality of the indoor air being measured.

The RSP matter determinations are made in microgram quantities whereas most air quality control studies are now conducted in milligram quantities. Thus, due to the greater accuracy required with RSP determinations, the RSP filter weighing procedure is a time consuming and tedious task. The current process, which is performed manually, requires eight to ten minutes for each weighing. Due to a typical sample load of, for example, 6,000 weighings per year, the time required and the tediousness of the task require extensive outlays for personnel and limit the number of samples which can be weighed in a given time. Further, since it is anticipated that indoor air quality standards will be imposed in the future, the sample load of filters to be weighed will be increased significantly.

SUMMARY AND OBJECTS OF THE INVENTION

In view of the foregoing, it should be apparent that there still exists a need in the art for a method of and apparatus for the automatic weighing of filters for air quality sampling and other purposes. It is, therefore, a primary object of this invention to provide a method of and apparatus for the unattended weighing of filters which has particular application for the weighing of RSP filters for air quality sampling studies.

More particularly, it is an object of this invention to provide an automated filter weighing method and apparatus as aforesaid having simple and reliable electronic circuitry which does not require frequent alignment nor costly components.

Still more particularly, it is an object of this invention to provide a method of and apparatus for weighing filters used in air quality sampling studies which operates in an unattended manner and which is capable of processing a substantial number of samples.

Briefly described, these and other objects of the invention are accomplished by providing a sample cabinet for holding a carousel having a plurality of samples contained in holders which is accessed by a robotic arm for removing each of the sample holders in turn and sequentially placing each of the sample holders in a filter removal station for removing the filter from its respective holder. The robotic arm then moves the filter to a microbalance which calculates the weight of the filter. The filter is then replaced in its holder and the holder replaced in the sample cabinet. The system is computer controlled and, once the sample cabinet is loaded with a carousel, operates automatically to weigh each of the filters.

With these and other objects, advantages and features of the invention that may become hereinafter apparent, the nature of the invention may be more deafly understood by reference to the following detailed description of the invention, the appended claims and to the several drawings attached herein.

BRIEF DESCRIPTION OF THE DRAWINGS

FIGS. 3A–3F show the user interface program for the software used for the robotic RSP filter weighing system of the present invention.

DETAILED DESCRIPTION OF THE PREFERRED EMBODIMENT

Figure 1:
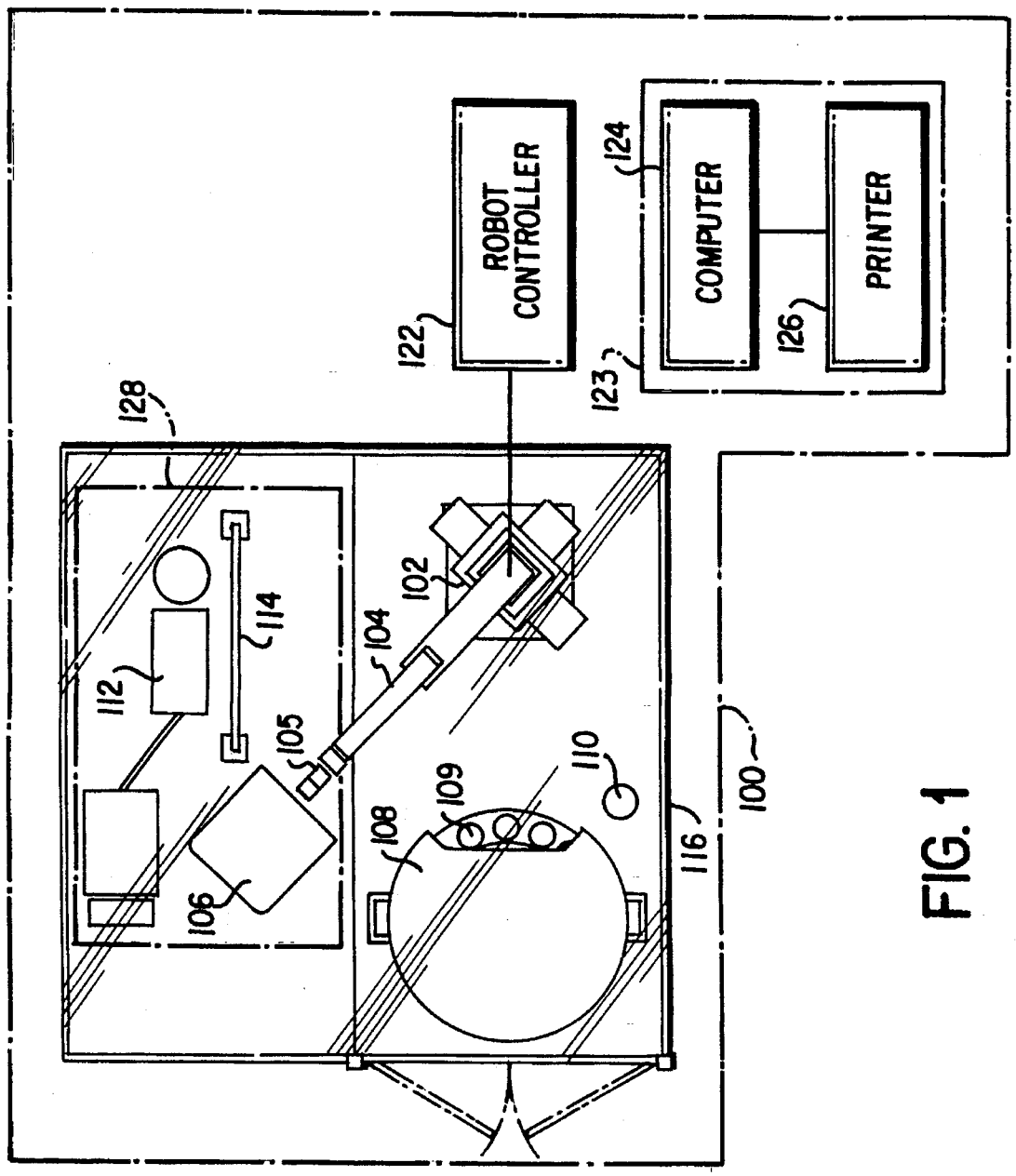
FIG. 1 is a block diagram showing the apparatus of the present invention.
Figure 2:
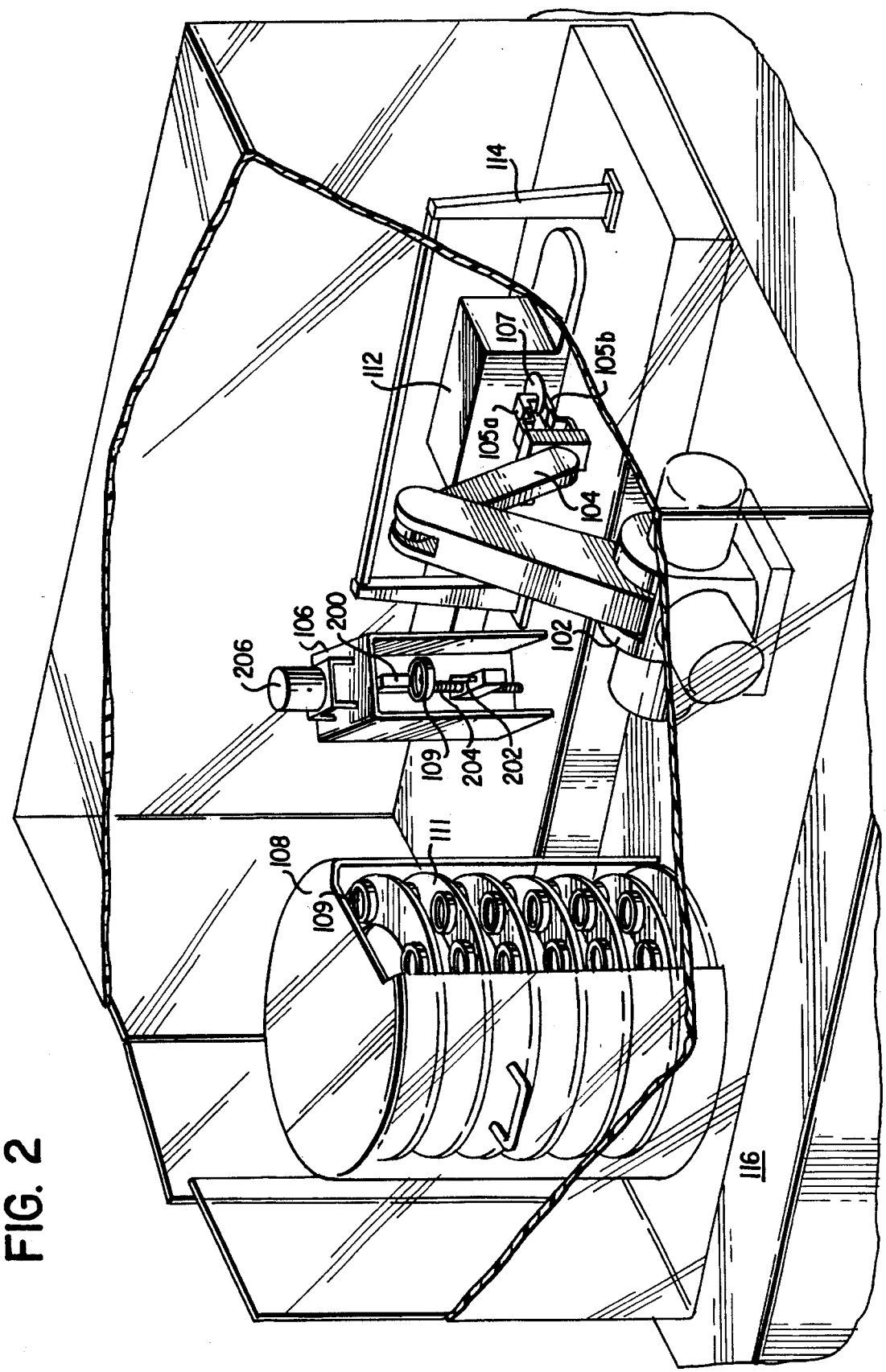
FIG. 2 is a diagram showing a perspective view of the apparatus of the present invention.

Referring now in detail to the drawings wherein like parts are designated by like reference numerals throughout, there is illustrated in FIG. 1 a block diagram showing the apparatus of the present invention which is built utilizing a CRS articulated robot 102 having a robotic arm 104 and, as shown in greater detail in FIG. 2, a gripper 105. A suitable robot is available from CRS PLUS, Inc. of Ann Arbor, Mich. The robot 102 includes an articulated robot arm 104 having a gripper 105 at one end for retrieving and manipulating filter holders and filters used with the system. The gripper 105 is capable of gripping with both a gripping arm 105a and a gripping finger 105b. Each of the gripping arm 105a and the gripping finger 105b utilize Teflon tips mounted at the end of the respective arm 105a and finger 105b. Teflon tips (not shown) are utilized as the component of the gripper which actually contacts the filter 107 since Teflon does not shed any particles onto the filter 107 which could add to the measured weight of the particulate matter carried by the filter 107.

The robot 102 is mounted to a specially designed table 116 which may be assembled using extruded aluminum beams and fasteners. The use of such a specially designed table 116 allows flexibility and reconfiguration of the table for expansion and/or modification of the system to meet future demands. The robot 102 is controlled by means of a robot controller 122 which is also available from CRS PLUS, Inc. The robotic controller 122 operates the robot 102 using robot programs written in a specialized language developed by CRS PLUS, Inc. As will be discussed later herein, the robot controller 122 receives instructions from the control software operating on the computer 124.

Preferably, the environment within the specially designed table 116 is controlled to about 55 percent relative humidity and 72° F. in temperature. Alternatively, the environment within the room in which the weighing system 100 of the present invention is situated can be controlled in the same manner.

Located on a bench or table (not shown) in the vicinity of the specialized table 116 is a bar code reading station 120, which may preferably be an IBM Model AT or compatible or more powerful IBM personal computer, with a Laserscan 8500 bar code reader from SYMBOL® Technologies, Inc. The bar code station 120 is used to set up run files by reading the bar code on each of the bar coded sample holders 109 as they are loaded into a carousel 111 which in turn forms part of each of the sample cabinets 108, 118. Because the bar code station computer 120 is connected to the control computer 124, it can also be used to receive reports of completed work, as well as system status during and after the weighing operations performed by the present invention. Obviously, the bar code station 120 can be located remotely from the weighing system 100 of the present invention, and could even be located at the indoor air quality testing site. In that event, once the carousel of the second sample cabinet 118 is filled with samples, the entire sample cabinet with the filled carousel would be shipped to the location of the weighing system of the present invention, rather than shipping a box containing the bar coded sample holders.

The robot controller 122 as well as the main control computer 124 and a printer 126 connected to the main control computer 124 are all contained in a control cabinet 123 which is located in the vicinity of the specialized table 116. The main control computer 124 functions to direct the robot controller 122 as well as to collect and analyze the data from the weighing system. It can also communicate, through a network, if desired, reports and run status to operators' desk computers located remotely from the weighing system 100. The computer 124 is preferably an IBM personal computer or compatible utilizing an 80486 Intel microprocessor or equivalent.

Also located on the specially designed table 116 is a sample cabinet 108 which is identical to the second sample cabinet 118. Each sample cabinet is designed to hold up to 90 sample holders 109 in a carousel 111. However, the sample cabinets could be designed to hold more or fewer sample holders. Each sample holder 109 contains a single filter 107.

As shown in FIG. 2, each of the sample cabinets 108, 118 holds a sample carousel 111 which in turn holds the 90 filter samples 107 for weighing. Each sample cabinet has six circular shelves which rotate together as a carousel. The shelves are rotated under control of the computer 124 to move the next sample holder 109 to the front opening of the cabinet. An index sensor 110 located on the specially designed table 116 adjacent to the sample cabinet 108 is used to provide a reference point on the carousel 111 for the computer 124. This configuration allows the robot 102 to pick up each of the sample holders 109 in turn in the correct order in which they were loaded onto the carousel 111.

The specially designed table 116 includes a balance table 128 which is mounted thereon in order to provide isolation from any vibrations which may affect the weighing process. A filter removal station 106 is mounted to the balance table 128 and is used to remove the filter 107 from the filter holder 109. Once the filter holder 109 has been moved by the robot 102 from the sample cabinet 108 to the filter removal station 106, a restraining stem 200 is lowered into the sample holder 109 and stops just above the back edge of the filter 107. At the same time, a rod 202 is moved upward through the center hole of the filter holder 109. That serves to raise the front edge of the filter 107 out of the filter holder 109 to a height and angle that the gripper 105 of the robot 102 can reach.

The filter removal station 106 is designed such that the restraining rod 200 is in place before the push rod 202 makes contact with the bottom of the filter 107. Sensors (not shown) are used to control the upward and downward travel of the rods. The rods 200 and 202 are carried by a rotating threaded rod 204 which is rotated under control of the computer 124 by a motor 206. An additional sensor (not shown) is used to determine if the robot actually retrieved the filter 107 from the filter holder 109. After removing the filter 107, the rods 200, 202 are moved back to their starting positions. That step readies the holder 109 for replacement of the filter 107 after weighing of the filter 107 has been completed.

After the filter 107 has been removed from its holder 109, it is placed by the robot 102 in a microbalance 112 for weighing. Prior to being placed in the microbalance 112, the filter 107 is passed under a static neutralizing bar 114, in order to eliminate any buildup of static charge on the filter 107 which could affect its weight. The neutralizing bar 114 may be placed above and to the side of the door of the microbalance 112. The neutralizing bar 114 may preferably be a DC static neutralizing system available from SIMCO, Inc. of Hatfield, Pa.

The balance 112 may preferably be a Model UMT2 microbalance available from Mettler Instrument Corporation of Hightstown, N.J. The microbalance 112 includes a motorized door which is slidable over the opening to the scale 112 during the weighing sequence in order to minimize any disturbance of the filter sample 107 to be weighed by air currents or the like. The filter 107 to be weighed is placed on the microbalance 112 alter the balance has been zeroed and its door opened. After the robot 102 places the filter 107 inside the balance 112 and backs out, the balance door is closed and then the tare weight of the filter 107 is sent to the computer 124 for storage and later processing. The balance door is then opened, the robot 102 removes the filter 107 and the balance 112 is then re-zeroed. Those steps are repeated until a predetermined number of weighings have been made.

After the final weighing, the robot 102 replaces the filter 107 into the holder 109 and places the holder 109 back into the sample cabinet 108. Each weight is stored in a temporary file 436 as it is obtained. After the last filter 107 has been weighed, the temporary file is processed and the weights, along with the average weight and standard deviation, are stored in a data base. The user will then examine the data. In the event that the difference between the results of the weighings, of a given filter sample 107, is greater than 5 micrograms, then the user will mark that filter sample 107 for re-weighing at a later time.

Turning now to FIGS. 3A–3F, there is shown a flow chart for the main user interface program which operates on the computer 124. This program is used to communicate with the operator in setting-up the run files, calculating the data, storing the data in a file and sending reports to other personal computers on the network to which the computer 124 may be connected. As discussed above, this program also communicates with the control software which directly controls the robot controller 122, the various motors (not shown) used in connection with the specially designed table 116 to perform the functions described above, the balance 112 and transfers the data to the network software (if present). The control software, like the network software, resides on the computer 124.

The Visual Basic user interface program is started at 300 by the user double-clicking on the "ETS robot" icon and then the program loads and displays the FrmSwitchBoard form at step 302. The program then processes events on the FrmSwitchBoard form as they occur at step 306 and then provides the user with the opportunity to start the robot at step 304 or to shut down the robot at step 308.

If the user elects to start the robot at step 304 then the robot start-up sequence, the flowchart of which is shown is FIG. 3B, is called. The operator is then asked certain questions at step 330 to ensure that the robot is ready to begin. If a positive determination is made at step 332 that the robot is ready to begin, then the robot pad weighing program is started at step 334. In the event that a negative determination is made at step 332, then the robot start-up sequence program ends and the main user interface program then returns to step 306 to await the next event.

In the event that it is determined at step 332 that the robot is ready to begin, then the robot pad weighing program is started at step 344. That entails calling the pad weighing control program shown in FIGS. 4A and 4B, which will be described hereinafter. After step 334 has been completed, then a timer is enabled at step 336 with a five second time out. A flow chart of the robot event timer is shown in FIG. 3F. The purpose of the timer event is to allow the user interface program 300 to detect when the pad weighing control program has stopped processing samples. That is necessary because the pad weighing control program and the user interface program operate independently of each other.

Once initiated, the timer event first checks the working directory for the robot finished file at step 362. A determination is then made at step 364 of whether the robot finished file is present. If it is determined that the robot finished file is present at step 364, then the weight file is processed at step 366. This sequence of events allows the user interface program to detect when the pad weighing control program is finished, and then proceed with processing the data collected by the pad weighing control program. If it is determined that the robot finished file is not present at step 364, then the timer is re-armed at step 368. After steps 336, 366 or 368, the program returns to step 306 to await the next event.

If the user chooses the Robot Shutdown option at step 308, then the robot shut down sequence program, the flowchart of which is shown in FIG. 3C, is executed. A determination is then made at step 338 of whether the user really wants to shut down the robot. If an affirmative determination is made at step 338, then a stop file is created on the working directory at step 340. After step 340, if the user indicates at step 338 that he does not want to shut the robot down, then the program returns to step 306 to await the next event.

If the user does not choose the start robot or shut down robot options of steps 304 and 308, respectively, then several other options are available from step 306. For example, the user can exit from the FrmSwitchBoard form at step 310 and then exit the program at step 320. Or, the user can use the Printer Setup option at step 316 which results in the display and processing of the Printer Setup common dialog box at step 326. The user can also choose the Printer Sequences option at step 318 which causes the display and processing of the FrmSelPrint form at step 328. The FrmSelPrint form allows the user to select any of the weighing sequences defined through steps 342, 344, 348, 354 and/or through steps 356, 358, 348, 354, to be printed on the currently selected printer. The user selects and/or configures the printer at step 326. After steps 326 and 328, the program returns to await the next event at step 306.

Figure 3A:
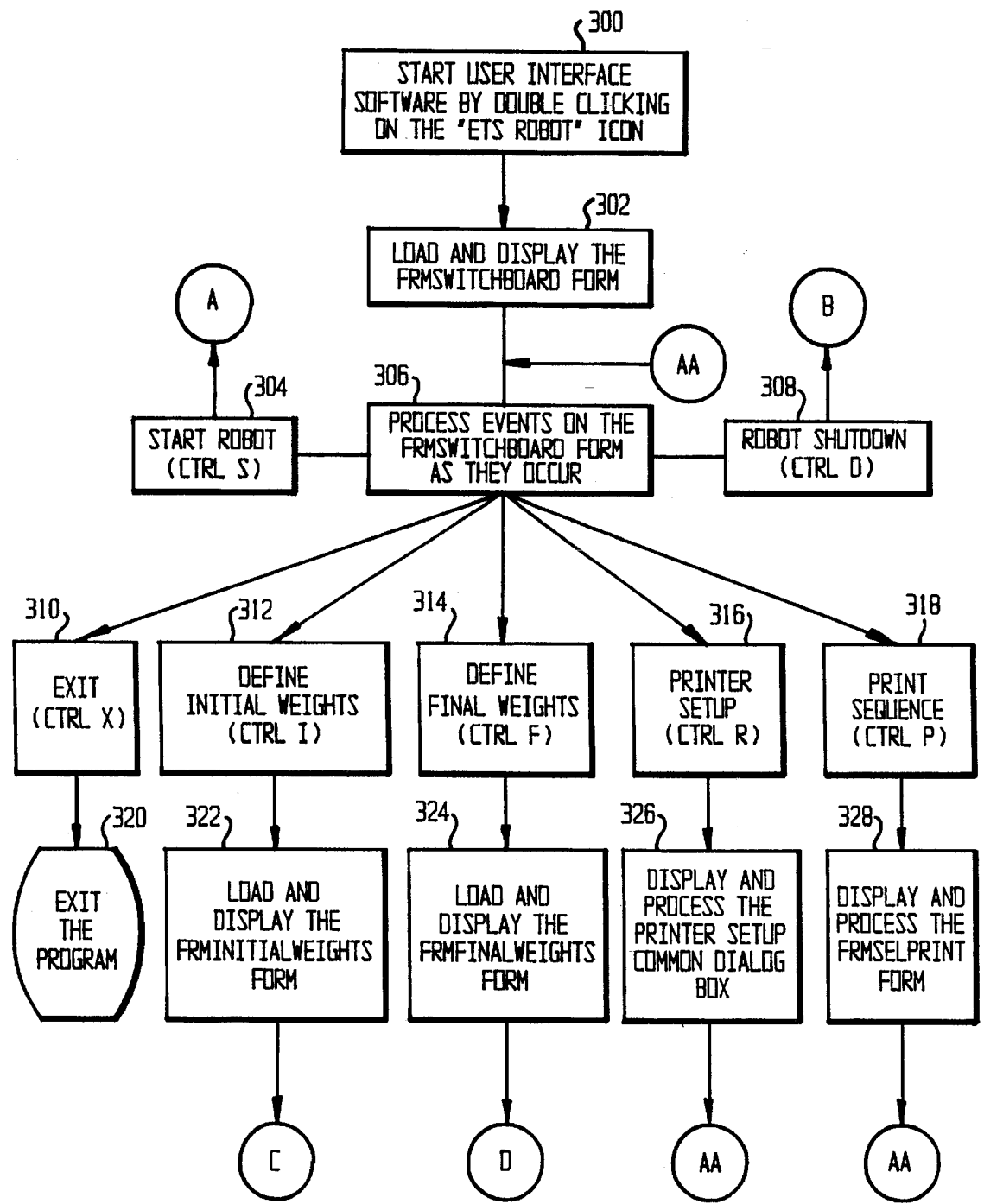
Figure 3D:
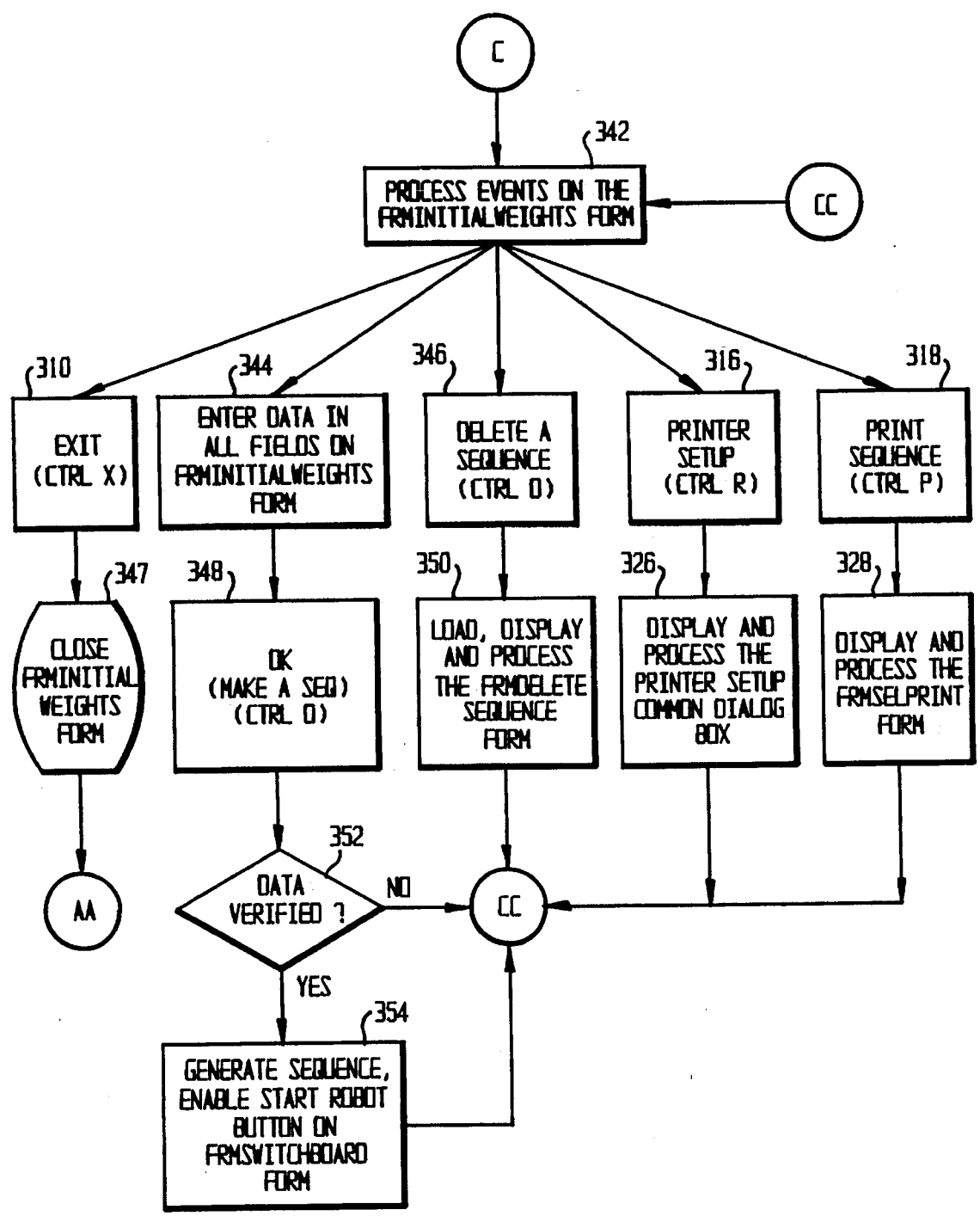

Two other options are available to the user at the FrmSwitchBoard form from step 306. At step 312, the user can choose the Define Initial Weights option, which causes the main user interface program to load and display the FrmInitialWeights form at step 322, which calls the FrmInitialWeights events form, the flow chart of which is shown in FIG. 3D. The user uses this form to define the initial weighing sequences. A sequence is defined by filling in all of the fields on the form and pressing the OK button.

Once the FrmInitialWeights events from module is called from step 322, the program processes the events on the FrmInitialWeights form at step 342 and then provides the user with a plurality of options. From step 342, the user can exit from the FrmInitialWeights events form at step 310, which results in the closing of that form at step 347 which returns the user to step 306 of the main user interface program. Or, the user can execute a Printer Setup or Printer Sequence, shown in steps 316 and 318, respectively, which offers the same result as steps 326 and 328, respectively, as described above in connection with the options available from step 306.

After step 342, the user has two other alternative options. First, the user can enter data in all fields on the FrmInitialWeights form at step 344 and then okay the making of a sequence at step 348. Once the user elects at step 348 to make a sequence, then a determination is made at step 352 of whether the data has been verified. If it is determined at step 352 that the data has been verified, then the desired sequence is generated and the start robot button on the FrmSwitchBoard form is enabled at step 354. After step 354 or steps 326 and 328, the FrmInitialWeights form module returns to step 342 to await the next event.

The final option available after step 342 is the Delete a Sequence option of step 346. Once the user selects that option, then the FrmDeleteSequence form is loaded, displayed and processed at step 350. After step 350, the FrmInitialWeights form module returns to step 342 to await the next event.

Figure 3E:
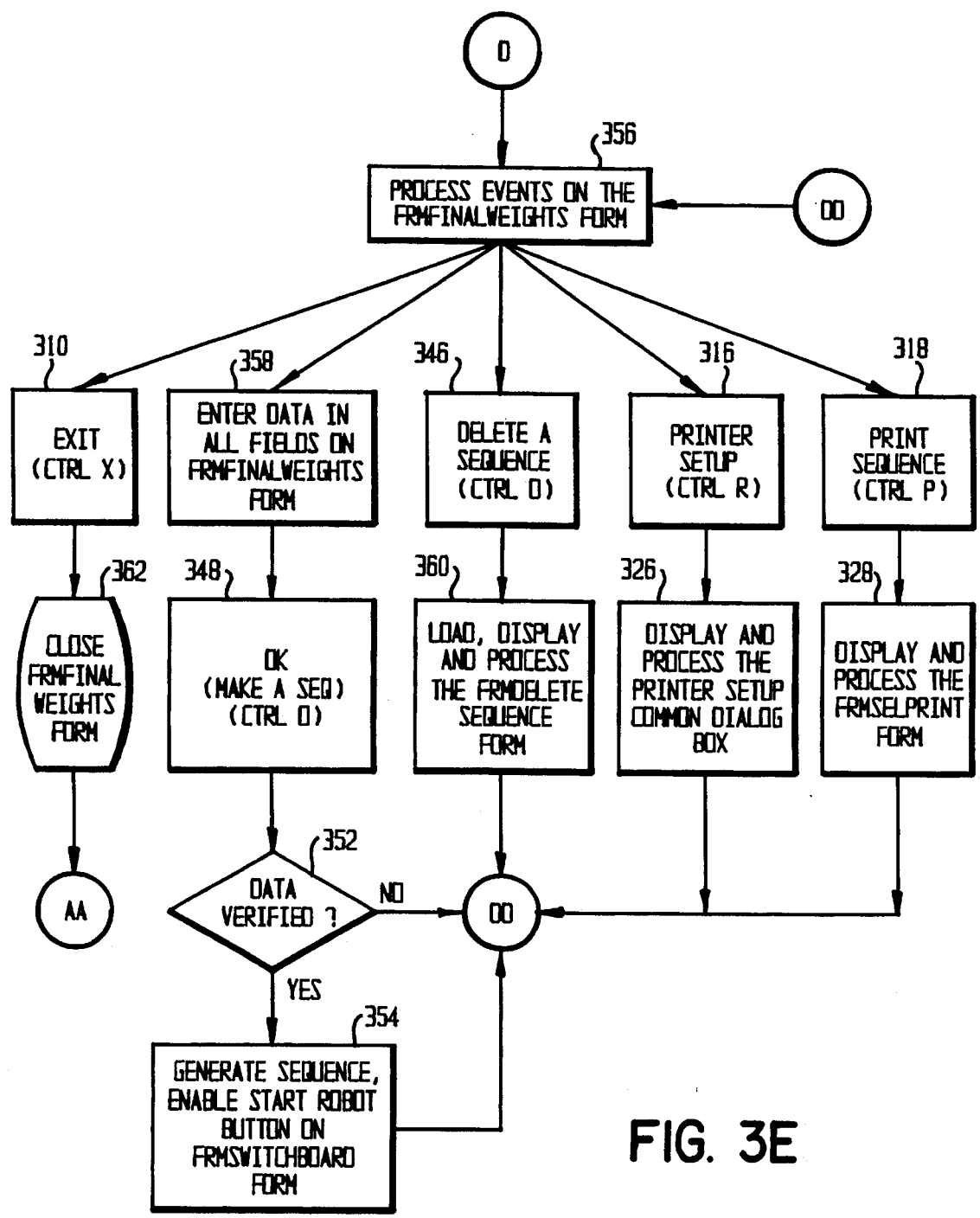

The final option available to the user from step 306 is the Define Final Weights option of step 314. Once the user selects that option, the FrmFinalWeights form is loaded and displayed at step 324 and then the FrmFinalWeights events form module, the flowchart of which is shown in FIG. 3E, is called. That module processes events on the FrmFinalWeights form, as shown at step 356. After step 356, the user has a choice of five options, two of which are the Printer Setup at step 316 and the Print Sequence at step 318, which are the same as has been described previously. The third option, which is similar to those that have been described previously, is to exit the FrmFinalWeights events form at step 310 which causes the FrmFinalWeights form to be closed at step 362 and the user to be returned to step 306.

The final two options available to the user at the FrmFinalWeights form are to enter data in all fields on that form at step 358 or to Delete a Sequence at step 346. If the user elects to enter data at step 358, then the user is asked to approve the making of the sequence at step 348 after which a determination is made at step 352 of whether the data has been verified. If an affirmative determination is made at step 352, then the sequence is generated and the start robot button on the FrmSwitchBoard form is enabled at step 354.

If the user chooses the Delete a Sequence option at step 346, then the FrmDeleteSequence form is loaded, displayed and processed at step 360. After steps 354, 360, 326, 328 or in the event of a negative determination at step 352, the user is returned to step 356 in order to process another event on the FrmFinalWeights form.

Figure 4A:
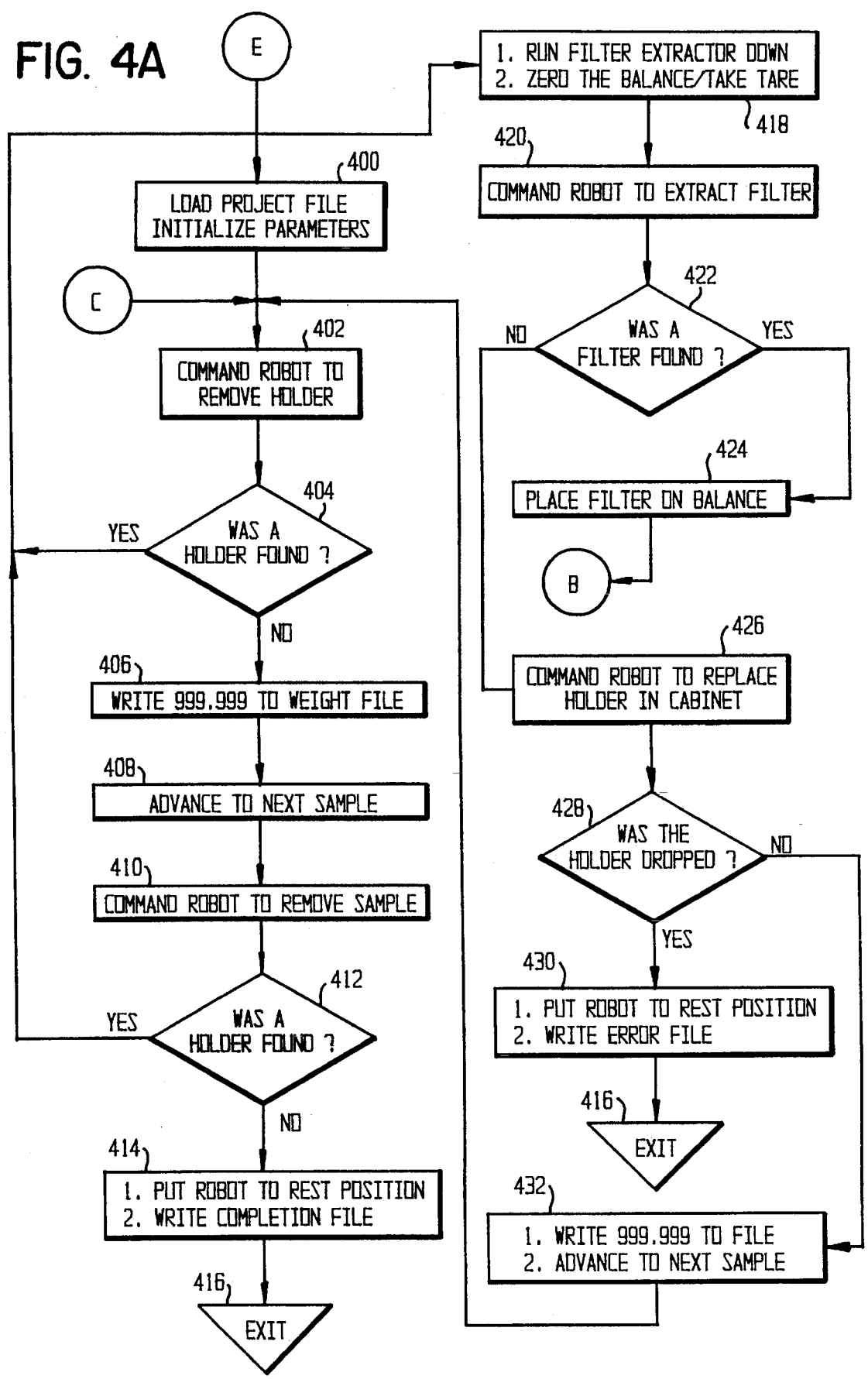
FIGS. 4A–4B show a flow chart of the control software used to operate the robotic RSP filter weighing system of the present invention.
Figure 4B:
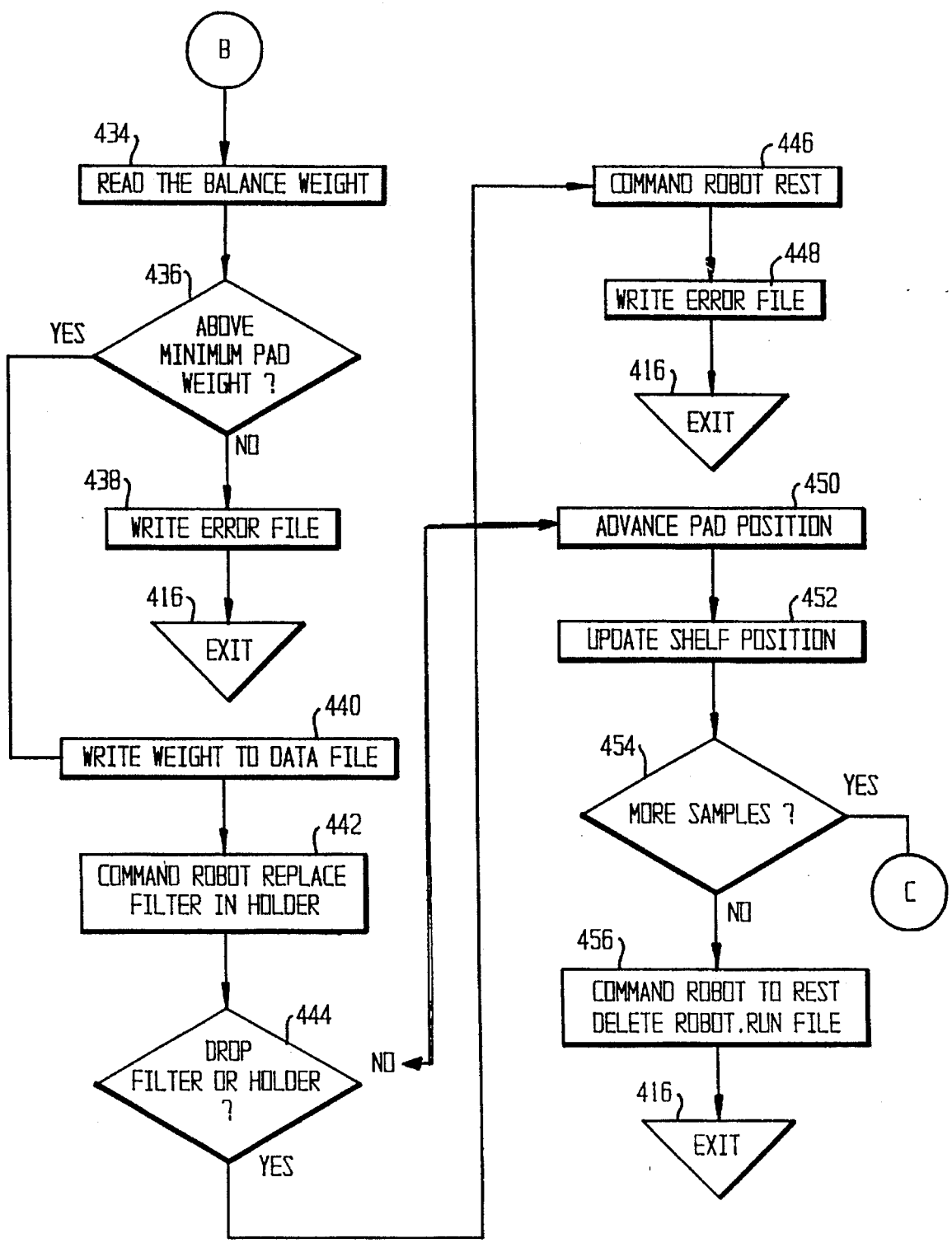

FIGS. 4A and 4B are flow charts of the pad weighing control software, hereinafter referred to as the "control program".

When the user selects the start robot option at step 304 from the user interface software, the control program first loads the desired project file and initializes the parameters at step 400. The robot 102 is then commanded at step 402 to remove the sample holder 109 from the sample cabinet 108. When the robot is commanded at step 402 to remove a sample holder 109 from the sample cabinet 108, the robot 102 then moves the robot arm 104 to the sample cabinet 108 and then picks up a sample holder 109 using the robot grippers 105a and 105b. It is then determined at step 404 whether the robot 102 has picked-up a sample holder 109.

If it is determined at step 404 that the robot gripper 105 has not found a sample holder 109, then the robot arm 104 and robot grippers 105 are backed-out of the sample cabinet 108. The control program writes the value of 999.999 to the weight file at step 406 and advances to the next sample at step 408.

If it is determined at step 412 that the robot has made a second try to find a sample holder 109 in the sample cabinet 108, then the robot 102 is put into a rest position and a completion file is written at step 414. The control program then exits at step 416.

If, as is usually the case, it is determined at step 404 that the robot 102 has found a sample holder 109 within the sample cabinet 108, then the control program instructs the filter removal station 106 to move the filter extractor down into its initial position and instructs the microbalance system 112 take a zero weight at step 418. The robot 102 is then commanded, at step 420, to extract the filter 107 from the filter holder 109. In order to accomplish that task, the robot 102 places the filter holder 109 in the filter removal station 106 and backs away. A restraining stem 200 within the filter removal station 106 is then lowered into the holder 109 and stops just above the back edge of the filter 107. At the same time, the filter extractor rod 202 is moved upward through the center hole of the sample holder 109. That causes the front edge of the filter 107 to be raised out of the holder 109 to a height and angle that the robot 102 can reach. The filter removal station 106 is designed such that the restraining rod 200 is in place before the push rod 202 makes contact with the bottom of the filter 107. The upward and downward travel of the two rods is controlled by using sensors, as is well known in the art.

After the filter 107 has been extracted from the filter holder 109 at step 420, a determination is made at step 422 of whether the robot 102 actually removed the filter 107 from the holder 109. A sensor (not shown) is used for that purpose. If it is determined at step 422 that a filter 107 was extracted from the filter holder 109, then the robot 102 places the filter 107 inside the balance 112 and then backs out. The balance door is then closed. The pad weight of the filter 107 is then read by the control program at step 434. The weight value is stored in the computer 124 for later retrieval and processing. A determination is then made at step 436 of whether the weight was below the minimum pad weight. If it is determined that the pad weight read below the minimum anticipated weight at step 436, it is assumed that the balance 112 was zeroed with the pad remaining on it. An error is written to the file at step 438 and the control program exits at step 416.

If it is determined at step 436 that the weight of the filter 107 is above the minimum pad weight, then that weight is written to the weight file at step 442 and then the robot is commanded to replace the filter 107 in the holder 109 at step 442.

After the robot has been commanded to replace the filter 107 in the sample holder 109 at step 442, the balance door of the microbalance 112 is opened and the robot removes the filter 107 from the balance. The balance 112 door is closed and the balance 112 is then re-zeroed. The foregoing steps are repeated until a predetermined number of weighings have been made and accepted by the computer 124. After the final weighing, a determination is made of whether the robot 102 has a filter 107 in its grip 105 and, if it does, the robot 102 replaces the filter 107 into the holder 109 from which it was removed, and places the holder 109 back into the sample cabinet 108. If it is determined that the robot does not have a filter 107 in its grip 105, then the robot is instructed to place the empty holder 109 back into the sample cabinet 108.

During the foregoing operations, a determination is made at step 444 of whether the robot has dropped the filter 107 or the holder 109. If it is determined that the robot has dropped the filter 107 or the filter holder 109 at step 444, then the robot is commanded to rest at step 446 and an error is written to the file at step 448. The control program then exits at step 416.

If it is determined at step 444 that the robot has not dropped the filter 107 or the filter holder 109, then a command is issued at step 450 to advance the pad position of the sample cabinet 108. The shelf position value is then updated at step 452. A determination is next made at step 454 of whether there are more samples to be weighed. If it is determined that there are additional samples to be weighed, then the control program jumps to begin processing of the next filter sample at step 402 by first commanding the robot to remove the then current filter holder 109 from the sample cabinet 108.

If it is determined at step 454 that all of the samples in the sample cabinet 108 have been removed by the robot 102 and weighed, that is, that there are no more filter samples to be weighed, then a command is sent to the robot 102 to place it in a rest position and the ROBOT.RUN file is deleted at step 456. The control program then exits at step 416.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A method for operating a robotic filter weighing system for weighing filters stored in sample holders, comprising the steps of:

selecting a sample holder containing a filter from a sample cabinet having a rotatable sample holder carousel;

moving said selected sample holder to a filter extraction station using a robotic system;

extracting the filter from said sample holder at said filter extraction station;

moving said extracted filter to a weighing station using said robotic system;

weighing said extracted filter at said weighing station to obtain a weight value;

replacing said extracted filter back into said selected sample holder using said robotic system; and replacing said selected sample holder containing said weighed filter back in its place in said sample cabinet.

2. The method of claim 1, further including the step of discharging any static electrical charge present on said extracted filter.

3. The method of claim 1, further including the step of storing said weight value.

4. The method of claim 1, wherein said weight value is stored in a digital data processing computer device.

5. The method of claim 1, wherein said weighing step is performed a plurality of times on said extracted filter.

6. The method of claim 5, further including the step of comparing the results of the plurality of weighings of said extracted filter in order to determine whether all of the weight values obtained are within a predetermined amount of each other.

7. The method of claim 1, further including the step of uniquely identifying said sample holders using a digital code.

8. The method of claim 7, wherein said step of uniquely identifying said sample holders is performed prior to selecting said sample holder from said sample cabinet.

9. A method of operating a robotic filter weighing system for the unattended weighing of filters containing particulate samples, said filters being stored in sample holders, comprising the steps of:

providing a plurality of processing stations in different locations adjacent to each other for performing a different process for the weighing of each of a plurality of filters contained in a like plurality of sample holders to determine the weight of said particulate samples on each of said plurality of filters;

using a robotic system for removing in turn each of said plurality of sample holders each containing a filter carrying a particulate sample which is to be weighed from a sample cabinet containing said plurality of sample holders and for removing each of said filters from its sample holder for moving said filter to each of said processing stations in a predetermined sequence such that the weight of a particulate sample on each of said plurality of filters is obtained; and said robotic system further returning each of said filters to its sample holder and each of said plurality of sample holders to said sample cabinet after said weight of said particulate sample has been obtained.

10. The method of claim 9, further including the step of determining whether said robotic system has removed a sample holder from said sample cabinet.

11. The method of claim 9, wherein each of said plurality of processing stations is controlled independently of each other under direction of a digital data processor.

12. The method of claim 9, further including the step of discharging any static electricity present in said filter after said step of extracting.

13. The method of claim 9, further including the step of rotating said plurality of sample holders within said sample cabinet in a predetermined manner such that said robotic weighing system systematically weighs each of said plurality of filters in turn.

14. The method of claim 9, further including the step of uniquely identifying each of said plurality of sample holders.

15. The method of claim 9, further including the step of weighing said extracted filter a predetermined number of times after said extraction step.

16. A robotic filter weighing system for weighing particulate samples collected on filters, each of said filters being contained in a separate sample holder, comprising:

a storage system for holding a plurality of sample holders;

a filter extraction system for extracting each filter from its respective sample holder;

a weighing system for weighing said extracted filter in order to determine the weight of said particulate samples on said extracted filter; and a robotic system for removing one of said plurality of sample holders from said storage system and moving it sequentially to said extraction system where said filter is extracted and then to said weighing system where said weight of said particulate samples is obtained.

17. The robotic filter weighing system of claim 16, further including a static electricity discharge system for discharging any static electricity charge held by said extracted filter before said filter is placed in said weighing system.

18. The robotic filter weighing system of claim 16, further including means for reading a bar code on said sample holder.

19. The robotic filter weighing system of claim 18, further including a digital data processor for receiving data from said weighing system and said bar code reading system.

20. A method for operating a robotic weighing system for weighing samples contained in sample holders, comprising the steps of:

selecting a sample holder from a sample cabinet;

moving said selected sample holder to a sample extraction station using a robotic system;

extracting said sample from said sample holder at said extraction station and moving said extracted sample to a weighing station using said robotic system; and weighing said extracted sample to obtain a weight value.

21. The method of claim 20, further including the step of replacing said extracted sample back into said selected sample holder using said robotic system.

22. The method of claim 21, further including the step replacing said selected sample holder containing said weighed sample back in said sample cabinet.

23. The method of claim 20, further including the step of storing said weight value.

24. The method of claim 20, wherein said weight value is stored in a digital data processing computer device.

25. The method of claim 20, wherein said weighing step is performed a plurality of times on said extracted sample.

26. The method of claim 25, further including the step of comparing the results of the plurality of weighings of said extracted sample in order to determine whether all of the weight values obtained are within a predetermined amount of each other.

27. The method of claim 20, further including the step of uniquely identifying said sample holders using a digital code.

28. The method of claim 27, wherein said step of uniquely identifying said sample holders is performed prior to selecting said sample holder from said sample cabinet.

29. A method of operating a robotic weighing system for the unattended weighing of samples, said samples being stored in sample holders, comprising the steps of:

providing a plurality of processing stations in different locations adjacent to each other for performing a different process for the weighing of each of a plurality of samples contained in a like plurality of sample holders to determine the weight of said samples;

using a robotic system for removing in turn each of said plurality of sample holders each containing a sample which is to be weighed from a sample cabinet containing said plurality of sample holders and for extracting each of said samples from its sample holder and for moving each of said samples to each of said processing stations in a predetermined sequence such that the weight of each of said samples is obtained; and said robotic system further returning each of said samples to its sample holder and each of said plurality of sample holders to said sample cabinet after said weight of said sample has been obtained.

30. The method of claim 29, further including the step of determining whether said robotic system has removed a sample holder from said sample cabinet.

31. The method of claim 29, wherein each of said plurality of processing stations is controlled independently of each other under direction of a digital data processor.

32. The method of claim 29, further including the step of rotating said plurality of sample holders within said sample cabinet in a predetermined manner such that said robotic weighing system systematically weighs each of said plurality of samples in turn.

33. The method of claim 29, further including the step of uniquely identifying each of said plurality of sample holders.

34. The method of claim 29, further including the step of weighing said extracted samples a predetermined number of times after said extraction step.

35. A robotic weighing system for weighing samples, each of said samples being contained in a separate sample holder, comprising:

a storage system for holding a plurality of sample holders;

a sample extraction system for extracting each sample from its respective sample holder;

a weighing system for weighing said extracted sample in order to determine the weight of said sample; and a robotic system for removing one of said plurality of sample holders from said storage system and moving it sequentially to said sample extraction system where said sample is extracted and then to said weighing system where said weight of said sample is obtained.

36. The robotic weighing system of claim 35, further including means for reading a bar code on said sample holder.

37. The robotic weighing system of claim 36, further including a digital data processor for receiving data from said weighing system and said bar code reading system.

* * * * *